United States Patent [19]
Liu

[11] Patent Number: 5,914,798
[45] Date of Patent: *Jun. 22, 1999

[54] RESTORATION SYSTEMS FOR AN OPTICAL TELECOMMUNICATIONS NETWORK

[75] Inventor: Shoa-Kai Liu, Richardson, Tex.

[73] Assignee: MCI Communications Corporation, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/580,608

[22] Filed: Dec. 29, 1995

[51] Int. Cl.$^6$ .............................. H04B 10/20; H04J 14/02
[52] U.S. Cl. ......................... 359/161; 359/110; 359/128; 370/221
[58] Field of Search .................................. 359/110, 117, 359/128, 159, 161, 179; 455/8; 370/217, 221, 225

[56] References Cited

U.S. PATENT DOCUMENTS

| | | | |
|---|---|---|---|
| 5,115,425 | 5/1992 | Ardon | 370/217 |
| 5,173,689 | 12/1992 | Kusano | 370/221 |
| 5,182,744 | 1/1993 | Askew et al. | 340/827 |
| 5,218,465 | 6/1993 | Lebby et al. | 359/110 |
| 5,396,485 | 3/1995 | Ohno et al. | 370/217 |
| 5,406,401 | 4/1995 | Kremer | 359/110 |
| 5,522,046 | 5/1996 | McMillen et al. | 370/217 |
| 5,548,639 | 8/1996 | Ogura et al. | 370/221 |
| 5,581,543 | 12/1996 | Natarajan | 370/221 |
| 5,586,112 | 12/1996 | Tabata | 370/221 |
| 5,590,119 | 12/1996 | Moran et al. | 370/225 |
| 5,592,467 | 1/1997 | Tekeuchi et al. | 370/225 |
| 5,598,403 | 1/1997 | Tatsuki | 370/221 |

FOREIGN PATENT DOCUMENTS

| | | | |
|---|---|---|---|
| 0620694 | 10/1994 | European Pat. Off. | 359/123 |

OTHER PUBLICATIONS

Ayanoglu, "Reduction of Restoration Capacity Requirements in advanced Optical Networks", Globecom '95, pp. 1018–1022, Nov. 1995.

*Primary Examiner*—Leslie Pascal

[57] ABSTRACT

An optical telecommunication network has a plurality of optical cross-connect switching nodes linked together by optical cables to form transmission paths for traffic between sending and destination stations. A centralized operation support system (OSS) is coupled to each node for receiving failure alarms and port status messages for failed cables from the switching nodes and terminal sites. The collected data is used to select alternate routes through the network using the spare capacity of the optical cross-connect switches and available wavelengths within the network. Any connection(s) to put into effect an alternate routing plan is broadcast to the affected nodes or terminal sites. A Real-Time Multiple Wavelength Routing (RMWR) algorithm is used by the OSS or by decentralized switching nodes to select, coordinate and route traffic among selected paths to bypass the failed cable such that wavelength collisions or adjacent cross-talk do not degrade the network performance. The OSS is updated when network restoration is performed by a switching node in the path of the failed cable.

19 Claims, 9 Drawing Sheets

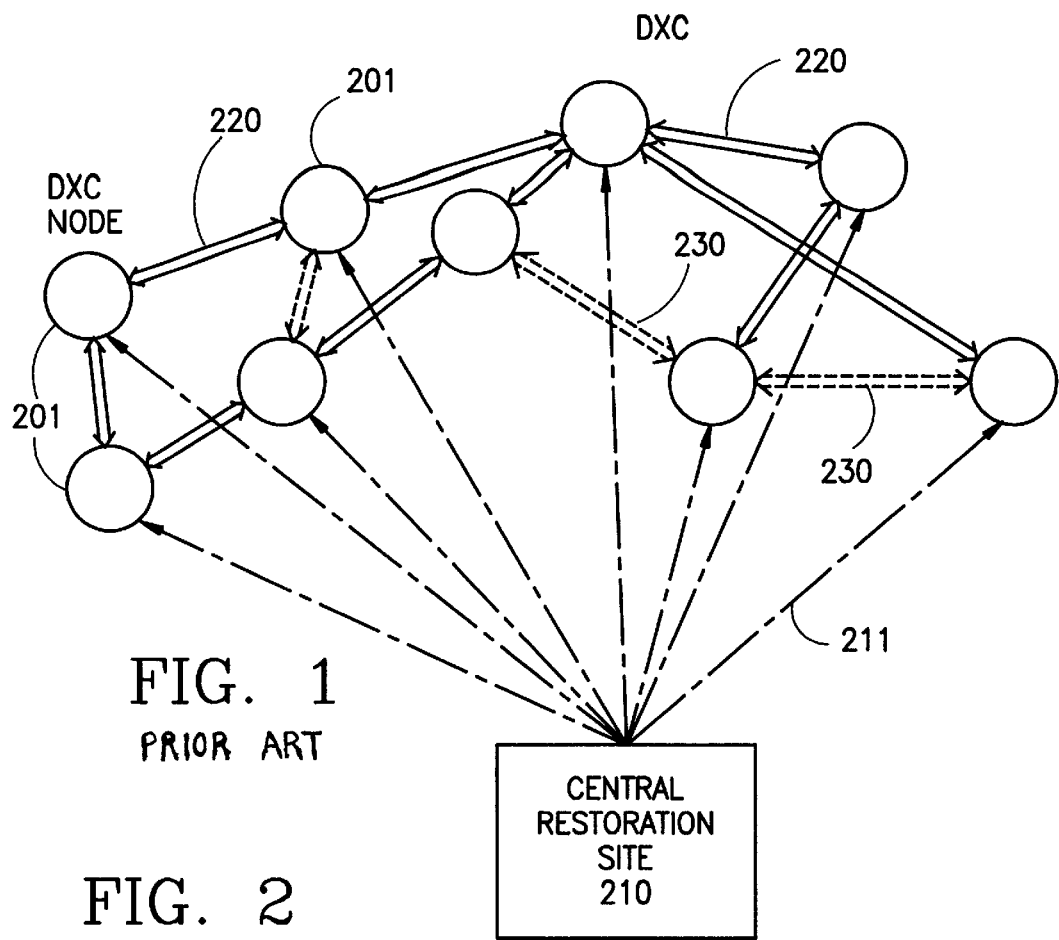
FIG. 1
PRIOR ART
FIG. 2
PRIOR ART
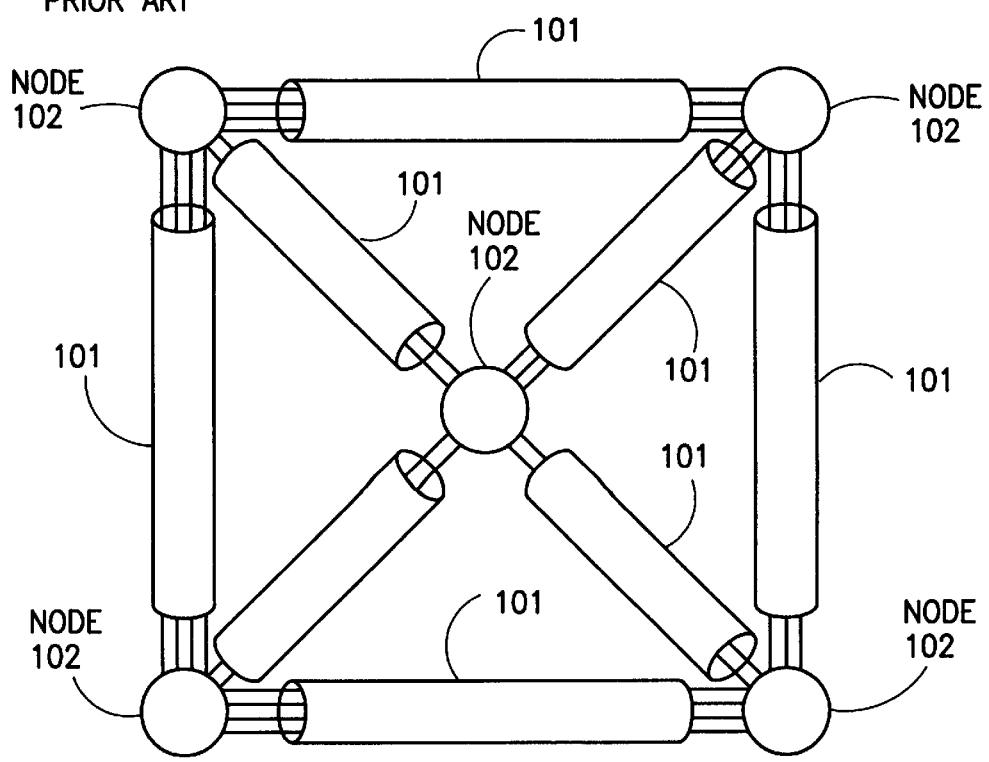

SWITCH CONFIRMATION LOGIC

RESTORATION SYSTEMS FOR AN OPTICAL TELECOMMUNICATIONS NETWORK

BACKGROUND OF THE INVENTION

1. Field of the Invention

This invention relates to telecommunication networks. More particularly, the invention relates to systems and methods for restoring operation in an optical network during a network failure.

2. Description of the Prior Art

A service disruption in a telecommunications network may be caused by inoperable communications links, cable cut or failure of equipment at a switching node. When a disruption occurs, the time to restore service depends upon a number of factors, such as (a) the time required to identify the location of the service disruption; (b) the time required to determine alternative routes that avoid the service disruption; and (c) the time required to actually establish such routes. In selecting a new telecommunications route, it is desirable to select the most efficient alternate route, that is, the one generally having the least number of nodes and links.

There are two network restoration schemes known to those skilled in the art which locate a service disruption, identify alternate routes and then establish such routes, in order that a service disruption will minimally affect the telecommunications user.

In the first restoration scheme, a telecommunication network includes a central site capable of establishing alternate routes when a failure occurs. The topology of a sample network consisting of a central restoration site is shown in FIG. 1, and also described generally in U.S. Pat. No. 5,182,744 to J. Askew et al. The central site 210 monitors communication paths for alarm signals from switching nodes. In case an alarm is detected, an alternate routing plan is derived and sent to the individual nodes.

In the second restoration scheme, as disclosed in U.S. Pat. No. 5,173,689 to T. Kusano issued Dec. 22, 1992, the network connections are restored by intelligent switching nodes distributed throughout the network. For example, the topology of a sample network consisting of intelligent switching nodes is shown in FIG. 2. Each node in the network (e.g. node 102 of FIG. 2) has the intelligence to identify a failed path, report it to other nodes of the network, and configure an alternate route.

Both restoration systems are designed to be implemented in wire-based telecommunications networks which have a maximum transmission rate of DS3 (DS3 stands for Digital Signal, third level and equals a transmission rate of approximately 44.736 Mbps). In contrast, the transmission rate of optical networks has been increasing steadily, and may reach 10 Gbps by the year 1996. An optical fiber-based system employing optical amplifiers will eventually carry 200 Gbps of information, equivalent to 3840 DS3's. Meanwhile some telecommunications service providers are proposing to use 32 wavelengths across the optical amplifier's amplification passband for their future network operation. This implies that multiple wavelength operation in the available optical spectrum will be commonplace. While simple wired connections may be easily switched in order to reconfigure a network around a fault, the problem lies in how to perform the same switching functions in a high-bandwidth optical network having space and wavelength multiplexing. Accordingly, there is a need for a telecommunications network restoration system employing high-bandwidth optical cross-connect switches enabling rapid switching of an optical network upon service disruption. Such systems must be able to rapidly identify failed optical fiber connections and devise an alternative routing plan using space and wavelength multiplexing to restore the optical network in real time.

SUMMARY OF THE INVENTION

In one form a centralized operation support system (OSS) receives failure alarms and port status messages from specialized switching nodes and terminal sites in an optical network. The collected data is used by a Real-Time Multiple Wavelength Routing (RMWR) algorithm to select an alternate path based on wavelength information stored in a centralized database. The OSS coordinates all optical cross-connect systems along the selected path and down loads the routing map to those network elements. The optical cross-connect switch system reroutes the traffic through the network for delivery to a final destination. Upon delivery, status is forwarded back to the OSS. The system returns to initial condition once the cable is fixed.

In another form the network has intelligent switching nodes which include the RMWR algorithm. Once the cross-connect system detects a major failure from incoming signals, the node sends a request to all connected adjacent nodes for an alternate route and wavelength information either through a predetermined path or randomly. After the originating node receives all responses, the RMWR algorithm will select an alternate route and initiate coordination messages to the nodes providing the alternate routes. All nodes then perform the connections to route the affected traffic to the final destination. The nodes keep the OSS informed during restoration. After restoration is complete, a map showing the new traffic routes is uploaded to the OSS for updating a central database. The system returns to initial conditions once the cable is fixed.

BRIEF DESCRIPTION OF THE DRAWINGS

FIG. 1 is a diagram of a prior art network topology for a central restoration system.

FIG. 2 is a diagram of a prior art network topology for a distributed restoration system consisting of intelligent switching nodes.

FIG. 6B defines the steps in the RMWR in an adjacent node receiving a request for an alternate route, and FIG. 6C defines the steps in the RMWR by an alternate node in transferring a signal path to bypass a fault condition.

DESCRIPTION OF THE PREFERRED EMBODIMENT

Figure 3:
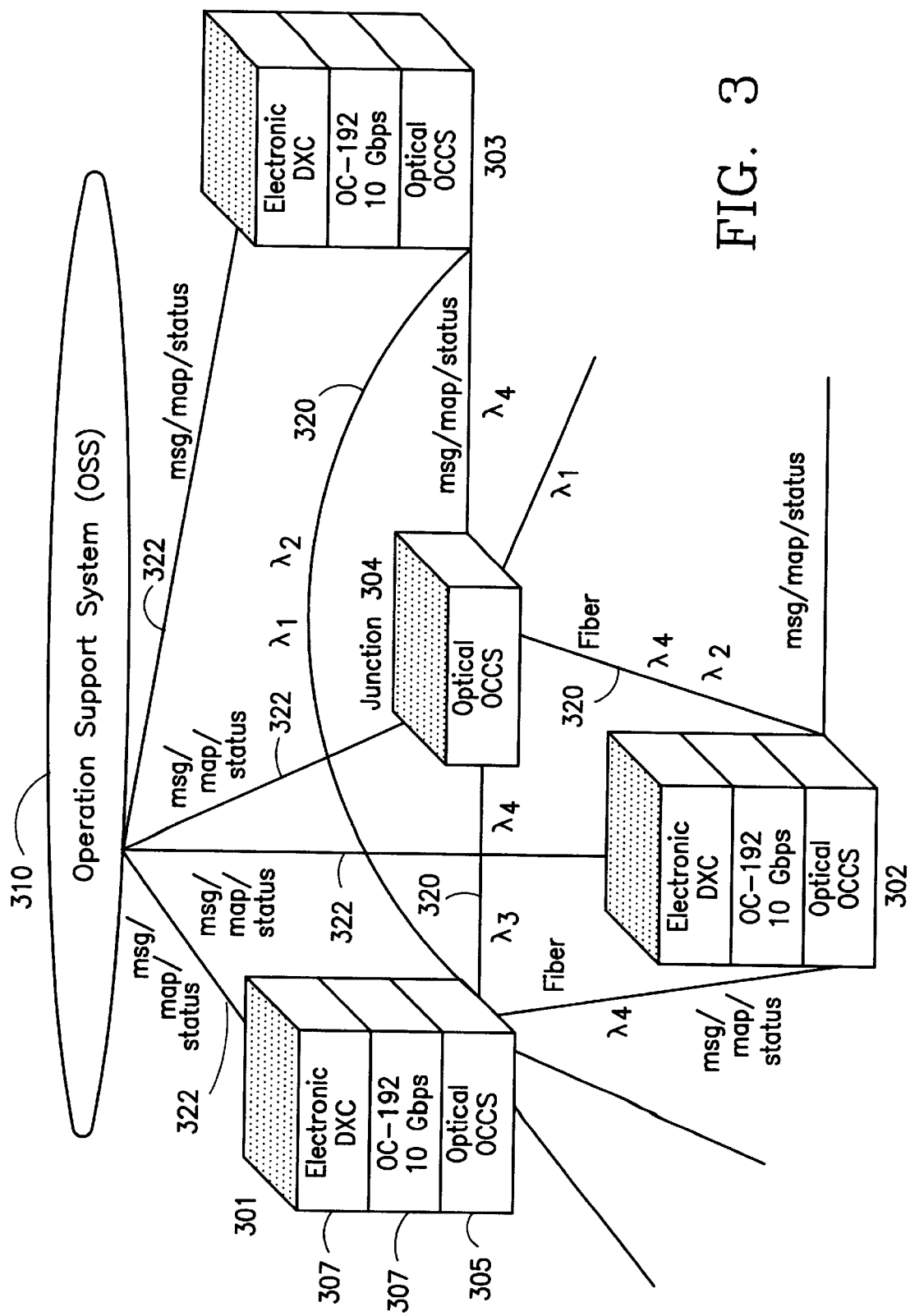
FIG. 3 is a block diagram of a centralized or decentralized optical restoration system incorporating the principles of the present invention.

The preferred embodiment of the invention is a communication network comprising, inter alia, optical fiber cables and upon failure, the restoration of services in the network being done optically via an optical cross-connect switch (OCCS). FIG. 3, as one embodiment, shows a local switching node 301 connected to other similar nodes (302 and 303) and a junction 304 through telecommunications medium in the form of optical fiber cables (320). Each network node and junction, in addition to connections to other OCCS nodes, maintains a link 322 to a central restoration site 310 called an Operation Support System (OSS) for providing message, mapping and status information. The links 322, shown as a star network in the system of FIG. 3, are not required to bear high bandwidth network traffic, and may thus be of any suitable configuration that provides desired reliability and sufficient speed of communications. The major switching nodes 301, 302, 303 in addition to including an optical cross connect switch 305 may, for example, be equipped with electronic digital cross-connect switch DXCs 309 (broadband and wideband) with different optical carrier (OC) interfaces (OC-3, OC-12, OC-48, or maybe OC-192), and OC-192 network element (NE) 307 in the optical cross-connect switch system. The OCCS operates in the optical domain and is similar to the DXC which operates in the electrical domain. The OC interfaces are used to switch between electronic signals and optical signals so that terminal equipment may be included at the node. For the junctions 304 only optical cross-connect can be installed since no terminal equipment exists. To provide additional spare capacity in case of failure of a communication path, there are spare wavelengths in the optical fibers, such as $\lambda_{(4)}$ which do not carry traffic before a traffic failure. Thus, in routing traffic around a failed path or nodes, a routing plan may utilize a spare wavelength within the fiber or redistribute the load among traffic-bearing fibers (320) that have spare wavelength capacity. To those skilled in the art, this is known as wavelength division and space division multiplexing, respectively.

Figure 4:
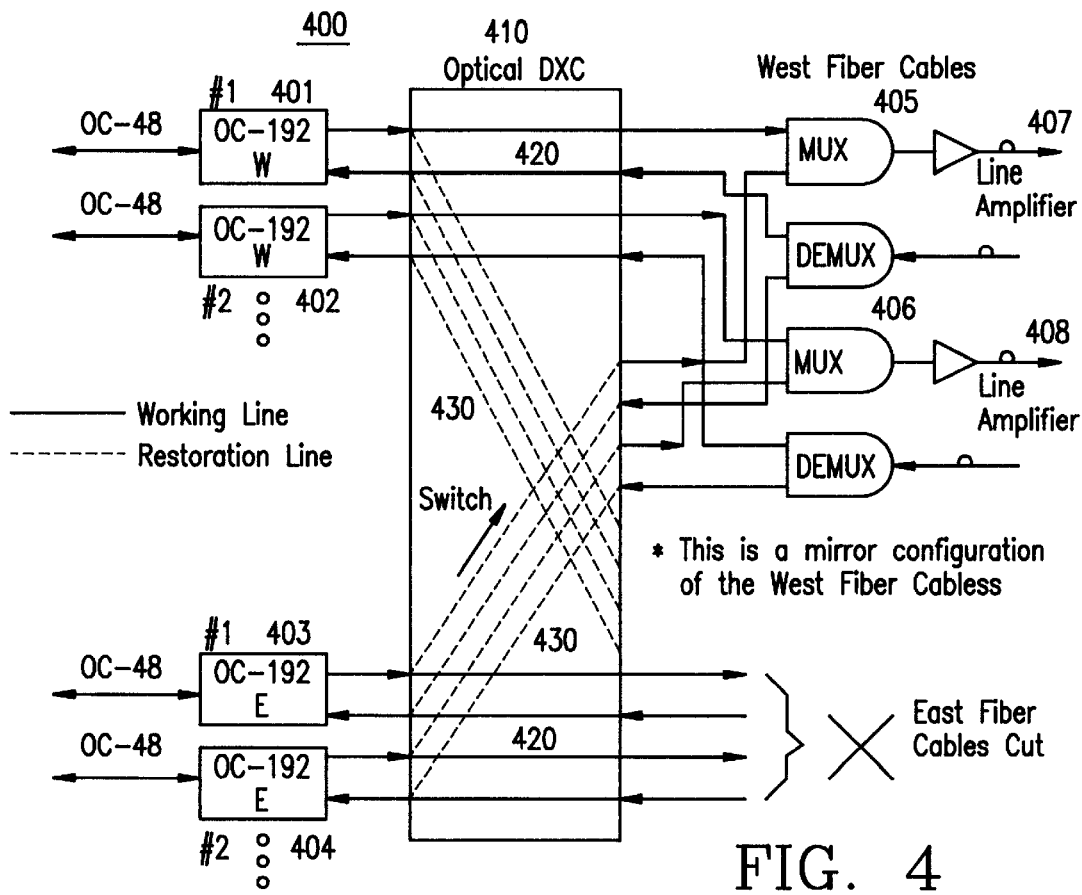
FIG. 4 is a block diagram of an optical digital cross-connect configuration including an optical line amplifier and narrowband wavelength division multiplexer/demultiplexer for use in the system shown in FIG. 3.

Besides the use of multiple wavelength operation to restore a service disruption within the telecommunications network, the optical cross-connect switch system residing in the switching nodes provides network restoration capability using spare restoration lines or space division multiplexing. FIG. 4 shows a space division network restoration node 400 using an optical line amplifier and narrowband waveband division multiplexer/demultiplexer. The node 400 comprises west-bound OC-192 NE's 401 and 402, and east-bound OC-192 NE's 403 and 404. The node also includes an optical cross-connect switch 410 wavelength multiplexer/demultiplexer 405 and 406, and optical line amplifier 407 and 408. Using the multiplexer/demultiplexer and line amplifier, the optical cross-connect switch 410 cross-connects/switch the east-bound traffic to west-bound fiber cables in case of east fiber cables cut, and vice versa for west fiber cables cut. Solid-line 420 and dash-line 430 in FIG. 4 designates the working line and restoration line respectively for such conditions. The multiplexer/demultiplexer 406 in conjunction with the line amplifier 408 restore the signal level existing on the cut cables to the west cables.

Figure 5:
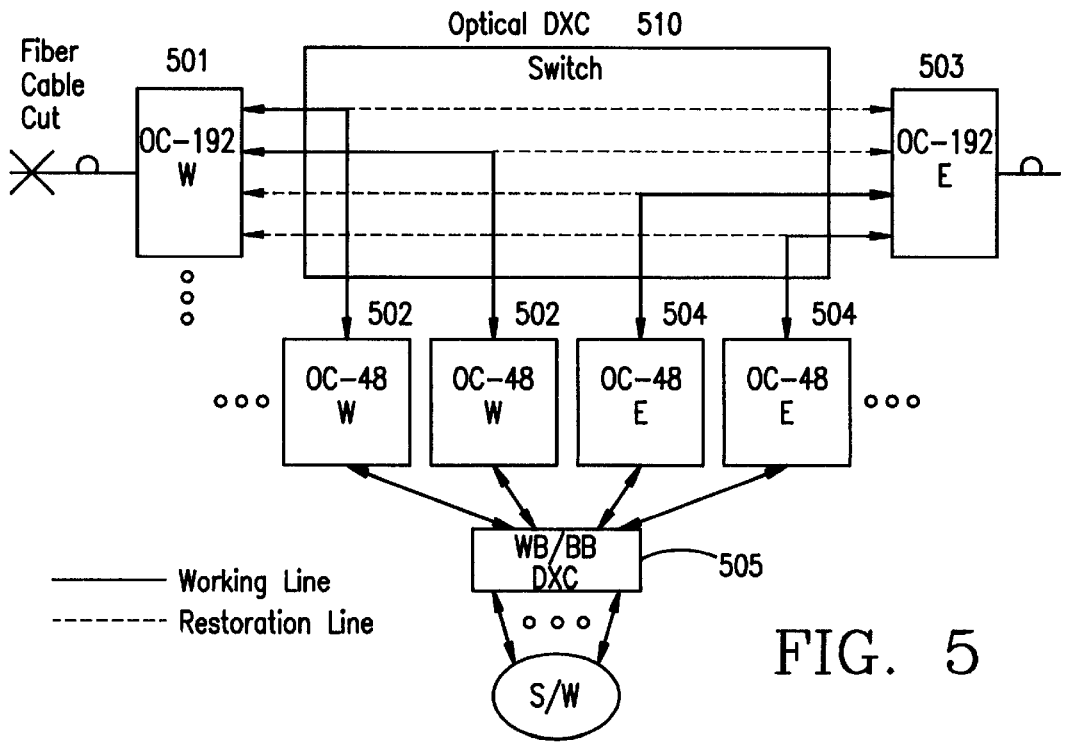
FIG. 5 is a block diagram of an optical digital cross-connect configuration using spare switch capacity for use in the system shown in FIG. 3.

FIG. 5 shows another network restoration node using OC-192 network elements (NE)'s spare capacity. The optical DXC system here includes west-bound OC-192 NE 501 and OC-48 NEs 502; east-bound OC-192 NE 503 and OC-48 NEs 504, and an optical DXC switch 510. The NEs 502 and 504 are arranged in a matrix for combinations into OC sizes. Using the spare capacity on the OC-192 NE's, the optical cross-connect switch reroutes the west-bound traffic through east-bound fiber cable in case of west fiber cable cut, and vice versa for east fiber cable cut. A wideband/broadband digital cross connect switch 505 under software control manages the matrix of NEs 502 and 504 to cross-connect the east-west cables OC-192.

Having described several restoration options within the optical DXC's, a more complete scheme of restoring an optical telecommunications network upon a service disruption used by the present invention will now be described. In conventional telecommunications systems having centralized restoration, as well as in that of the present invention, message traffic along a fiber connection is monitored at the switching node for errors or faults. An alarm is generated at the node for each detected error. If a fault or failure affects traffic at a plurality of nodes, an alarm will occur at each switching node.

In one embodiment of the present invention, all alarms generated by a DXC node are forwarded with minimal processing to the centralized OSS 310 (see FIG. 3). The DXC node in the preferred embodiment does not filter the alarms or identify the cause (fault). Along with raw alarm data, each DXC node forwards to the OSS a report on the status of its switch ports (port status). After communicating alarm status to the centralized OSS, the DXC node suspends processing of the reported fiber failure alarms and takes further action only by command from the centralized restoration OSS. In another embodiment of the invention, once a cross-connect switching node detects a major failure from incoming signals, a request is sent by the originating point to all connected adjacent nodes for an alternate route and wavelength information. Each adjacent node begins the selection of an alternate path and sends the selection and wavelength information to the originating point or source node. Both embodiments activate a Real-Time Multiple Wavelength Routing (RMWR) algorithm to coordinate, select and route restored traffic among selected paths that wavelength collision or adjacent channel cross-talk does not degrade system performance.

Figure 6A:
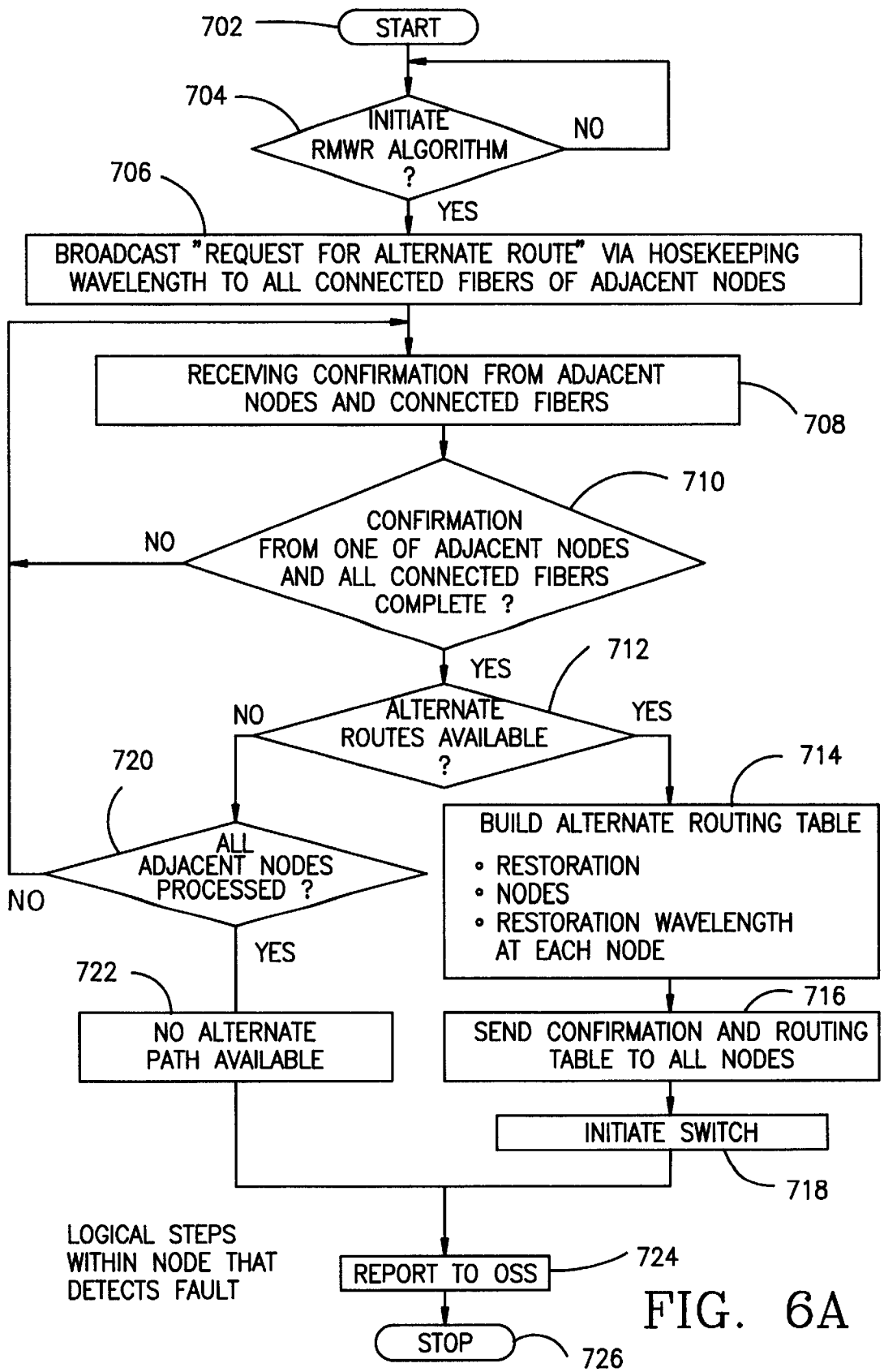
FIGS. 6A, 6B and 6C are flow diagrams of a Real-Time Multiple Wavelength Routing (RMWR) algorithm for use in the present invention wherein FIG. 6A defines the steps in the RMWR within a switching node when a fault is detected.
Figure 6B:
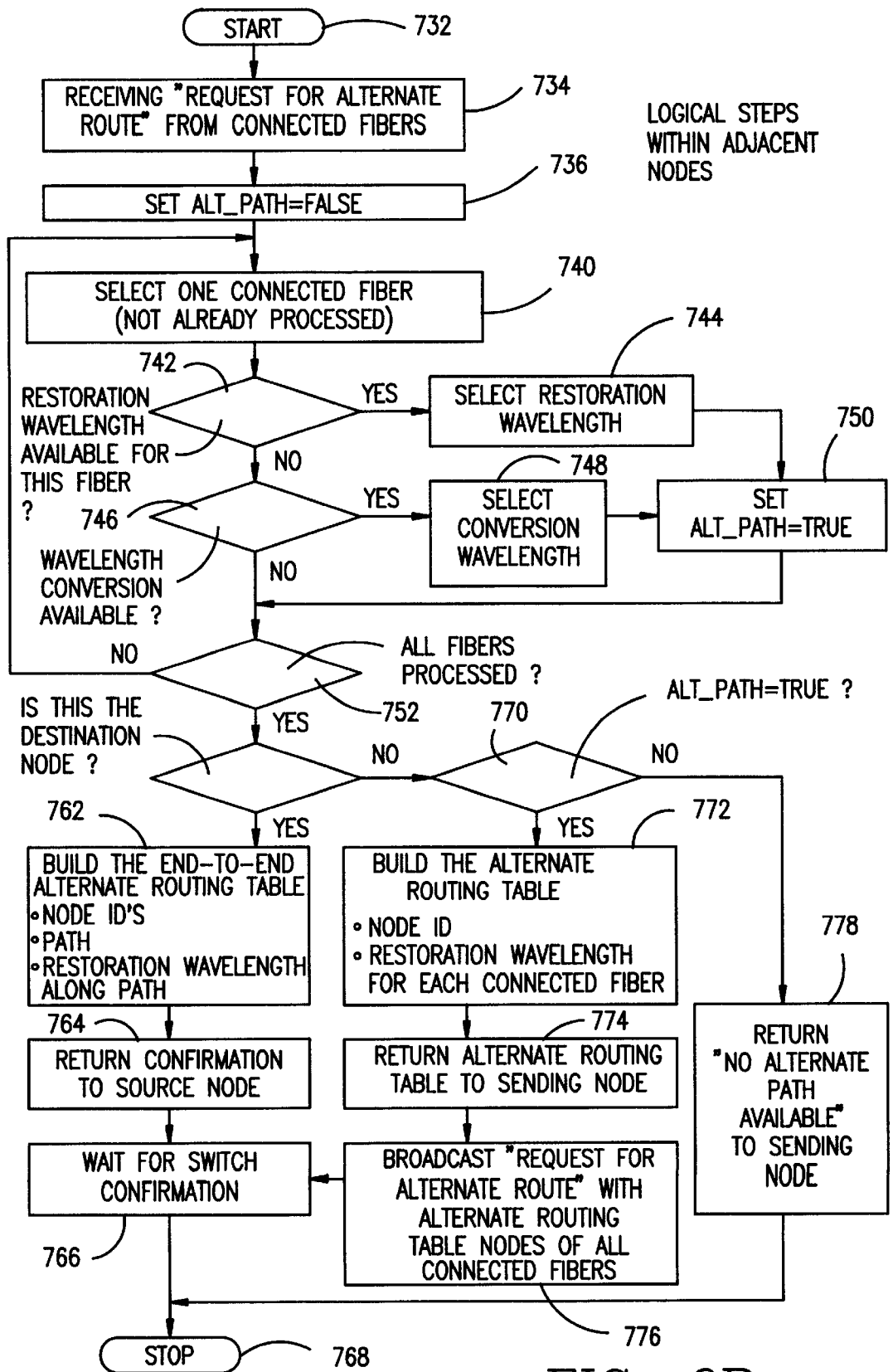
Figure 6C:
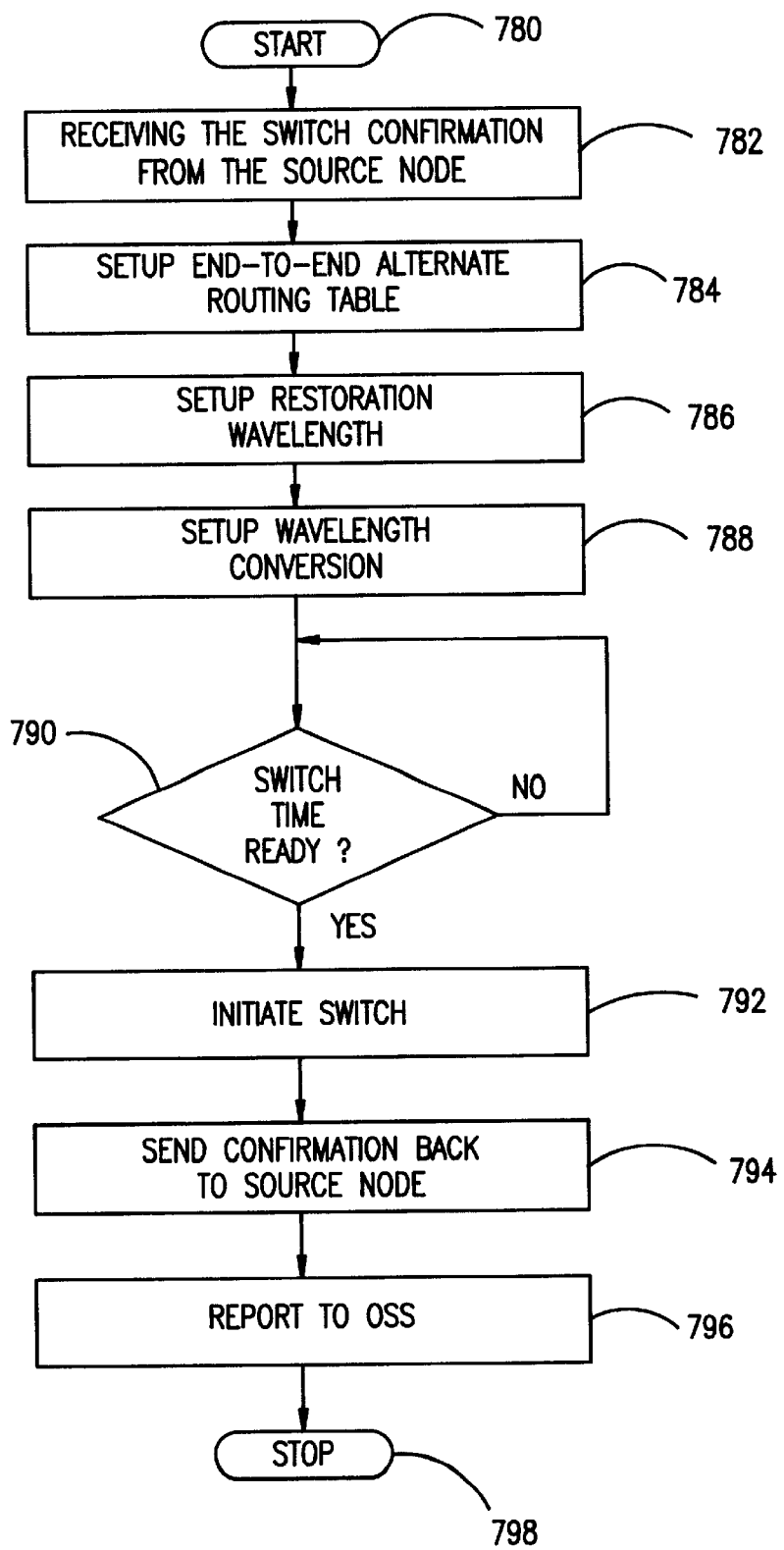

Turning to FIGS. 6A, 6B, and 6C, an RMWR algorithm will be described before describing the restoration processes of the present invention. The RMWR process of FIG. 6A is entered in an operation 702 when a switching node such as 301, 302, or 303, (see FIG. 3) identifies a failed communication link using conventional electrical testing techniques or all optical detection scheme, or both. The RMWR installed at the detecting node is initiated in an operation 704. A "no" condition retains the algorithm in a waiting state. A "yes" condition initiates an operation 706 in which the fault detecting node broadcasts a request for alternate routes to all connected fibers of adjacent nodes using a housekeeping wavelength. An Operation 708 is performed by the detecting node to receive confirmations from adjacent nodes and connected fibers of the request for alternate routes. The detecting switching node in an operation 710 remains in a waiting state for a "no" condition until confirmation from one of the adjacent nodes and all completed fibers is complete. When confirmation is received, a "yes" condition initiates an operation 712 to determine the availability of alternate routes. A "yes" condition initiates an operation 714 to build an alternate routing table in the switching node. The table includes the restoration path selected; the nodes in the path and the restoration wavelength at each node. Upon completion of the operation 714, the detecting switching node in operation 716, sends a confirmation and routing table to all nodes involved in the alternate path.

The alternate switching path is initiated in an operation 718 and the details of the alternate path are provided in a report to the controller or OSS by the detecting switching node in an operation 724.

Returning to the operation 712, a "no" condition initiates an operation 720 which remains in a waiting state or "no" condition until all adjacent nodes are processed for alternate paths. A "yes" condition initiates an operation 722 indicating no alternative path is available for the failed path. A report is sent to the controller or OSS in an operation 724 when no alternative paths are available. Upon completion of the reports to the controller or OSS, the detecting switching node returns to a normal state.

The RMWR process of FIG. 6B is entered in an operation 732. When an adjacent node to a detecting node receives requests for alternate routes from connected fibers to the node an operation 734 is initiated. An alternate path is set=false by the algorithm in an operation 736 until the availability of an alternate path is determined. An operation 740 is performed at each adjacent node to monitor each fiber connected to the alternate node, one at a time, for processing as an alternate path in an operation 740.

An operation 742 determines the availability of a restoration wavelength available for the fiber. A "yes" condition selects the restoration wavelength in an operation 744 and provides one input to an operation 750 for setting an alternate path=true. Returning to the operation 742, a "no" condition initiates an operation 746 to determine the availability of wavelength conversion. A "yes" condition initiates an operation 748 to select a conversion wavelength which is provided as a second input to the operation 750. When the wavelength availability and conversion are complete, the fiber/selection process is continued in an operation 752 until all fibers are processed. A "yes" condition initiates an operation 760 to determine the destination node for the fiber. A "no" condition initiates an operation 770 setting an alternate path=true state for the node. A "no" condition initiates an operation 778 to return a "no" alternate path available to the sending node. A "yes" condition for the operation 770 initiates an operation 772 to build the alternate routing table comprising the node identification; the restoration wavelength for each connected fiber. The alternate routing table generated by the alternate node is returned to the sending or detecting node in an operation 774. The alternate node broadcast a request for alternate routes to adjacent nodes of all connected fibers in an operation 776. The adjacent node waits for switch confirmation by the sending node in an operation 766 and thereafter returns to a normal state.

Returning to the operation 760, a "yes" condition initiates an operation 762 which builds an end-to-end alternate routing table for alternate node which is also the destination node for the failed signal path. The table comprises the identification of each node in the path and the restoration wavelengths along the path. When the end-to-end alternate routing table is completed, a confirmation is sent to the sending or source node in an operation 764. The alternate node stores the table and waits for switch confirmation from the sending or source node in operation 766. Upon completion of the operation 766, the alternate node returns to the normal condition.

The RMWR process of FIG. 6C for switch confirmation at the alternate node is entered in an operation 780. The switch confirmation by the sending node is received in an operation 782. An end-to-end alternate routing table is set up in the adjacent node in an operation 784. The alternate node sets up the restoration wavelength for the alternate path in an operation 786 and sets up a wavelength conversion in an operation 788. The alternate end-to-end path is not initiated by the alternate node until a switch time ready operation 790 is performed. A "yes" condition initiates the switching of the failed path to the alternate path in an operation 792. A confirmation of switching to the alternate path is sent back to the source node in an operation 794. The alternate node reports the alternate path to the controller or OSS in an operation 796 and returns to the normal condition in an operation 798.

Figure 7:
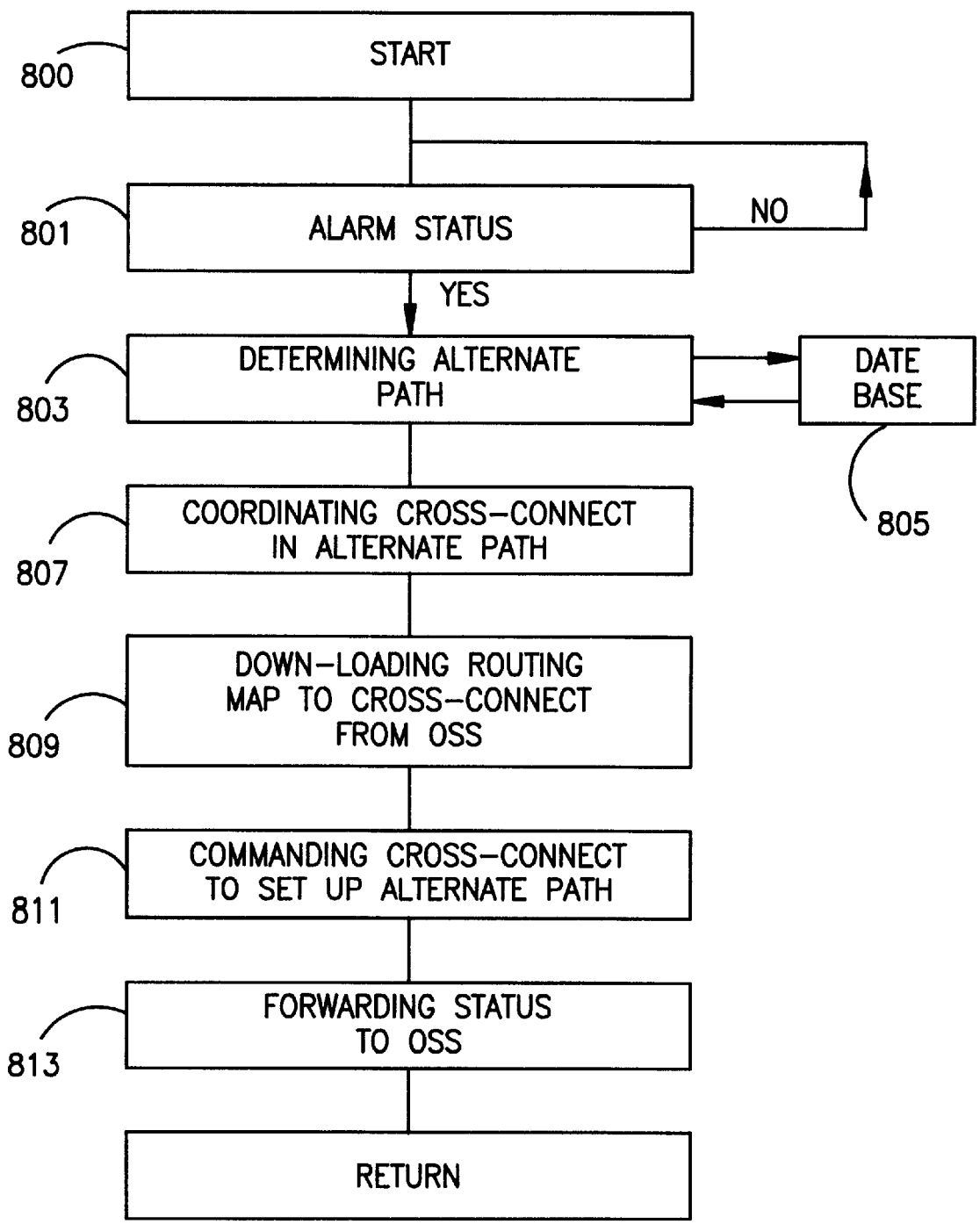
FIG. 7 is a flow diagram of a centralized restoration procedure for the system of the present invention using the RMWR of FIG. 6.

In FIG. 7, the centralized restoration process of the present invention is entered in an operation 800. The alarm status of the nodes under control of the OSS is monitored in an operation 801. A "no" condition continues the alarm monitoring process. A "yes" condition initiates an operation 803 using the RMWR algorithm described in FIG. 6A for selecting an alternate path based upon wavelength information for a failed cable. As a part of the operation 803, a database is accessed in an operation 805 for the wavelength information on spare or active cables. Upon selection of an alternate path based upon the wavelength information, an operation 807 is performed by the OSS to coordinate all cross-connect systems along the selected alternate path. In an operation 809, the routing map is down loaded by the OSS to the NEs in the alternate path. In an operation 811, the OSS commands the crossconnect systems in the alternate path to re-route or bypass the traffic in the failed path to the alternate path for delivery to the final destination. Upon completion of the alternate path, each node in the alternate path provides status information to the OSS in an operation 813. The system is returned to the normal condition once the failed path is fixed.

Figure 8:
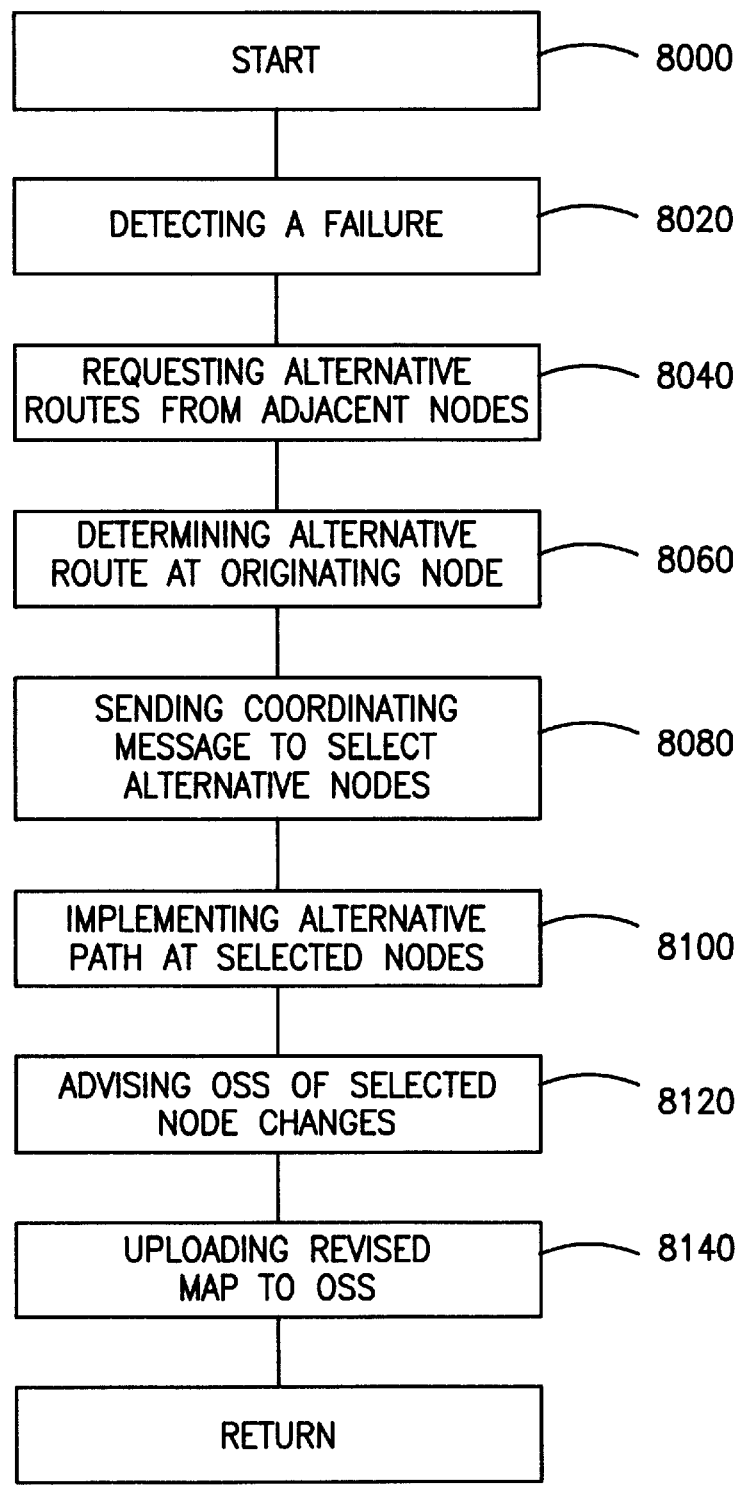
FIG. 8 is a flow diagram of a de-centralized restoration procedure for the system of the present invention using the RMWR of FIG. 6.

Turning to FIG. 8, the decentralized restoration process of the present invention is entered in an operation 8000. An operation 8020 is performed by each node until a failed signal path is detected. Upon detection of a failed path an operation 8040 sends a request to all connected adjacent nodes for alternate route and wavelength information and to use spare wavelength if necessary. The request may be broadcast to the network or routed through pre-selected paths. In an operation 8060, after all responses are received by the detecting node from adjacent nodes, an alternate signal path is selected by the detecting node using the RMWR algorithm described in FIG. 6A. In an operation 8080, the detecting node sends coordinating messages to the selected nodes in the alternate path. The selected nodes perform the connections in an operation 8100 to establish the alternate path to the final destination for the affected traffic. During the process of establishing the alternate path, the selected nodes in the alternate path indicate their status to the OSS in an operation 8120. After restoration is complete, a map showing the new traffic route is uploaded by the detecting to the OSS in an operation 8140 for updating the centralized database. The system is returned to the normal condition once the failed path is fixed. This method of the invention does not require OSS to select routes or build the routing map, and is a more cohesive and distributive algorithm. In some applications, this configuration may be better than a centralized restoration algorithm in terms of cost, performance, implementation, and flexibility for upgrading the system.

Figure 9:
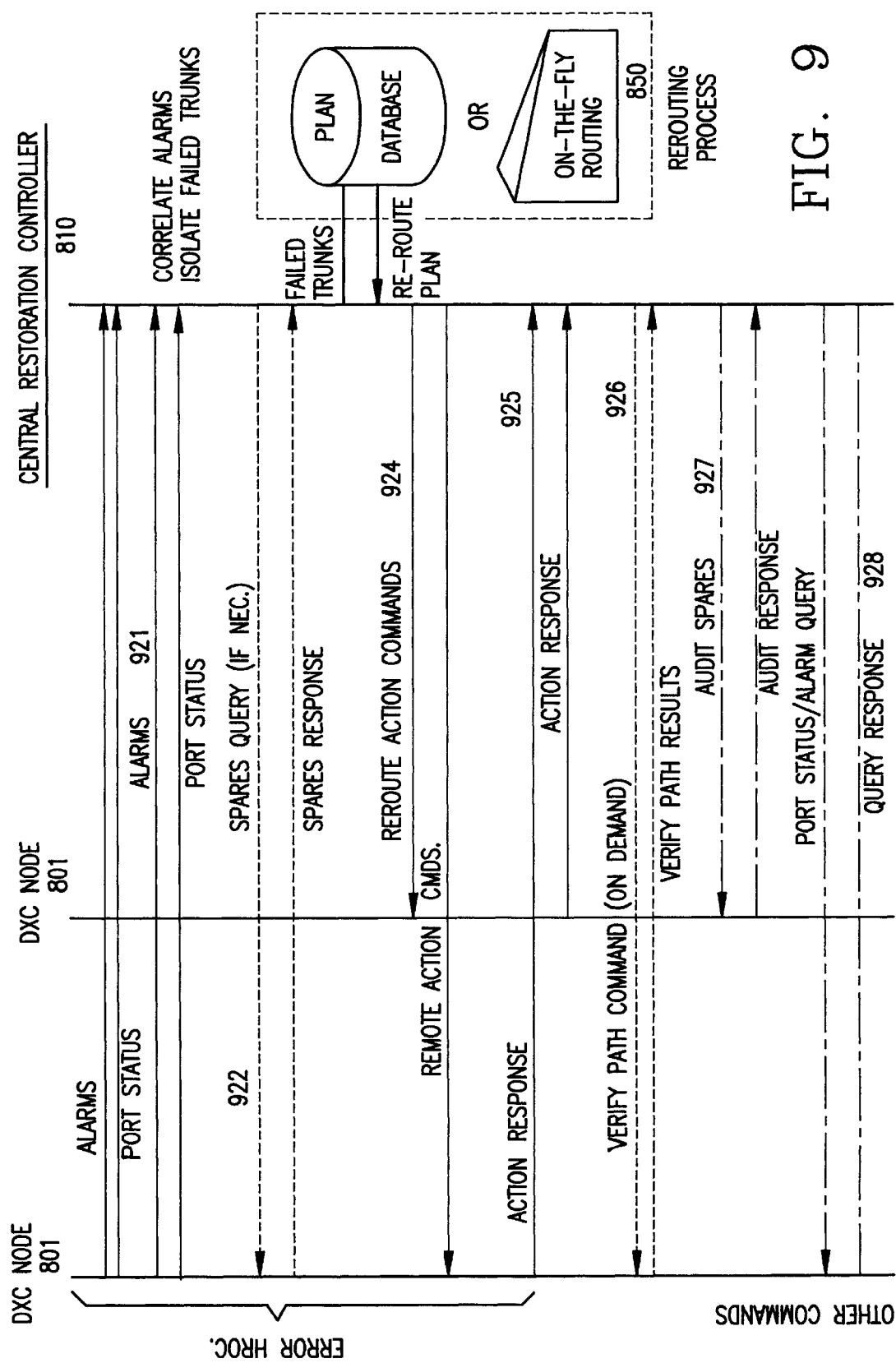
FIG. 9 is a signalling diagram between switching nodes and a central restoration site for selecting alternate paths in bypassing a failed communication link.

Communication between the DXC nodes and the centralized restoration OSS is shown in more detail in FIG. 9. As explained with reference to FIG. 6A, a DXC node sends alarms as they occur, along with the status of the switch ports (step 921 of FIG. 9). The centralized restoration OSS collects alarms from all DXCs in the network that may have failed connections and correlates related alarms. Using port status data supplied with alarms, the centralized OSS relates the collected alarms to a topology of the network in order to isolate a failed fiber cable. The OSS can demand additional data needed to isolate a failure, e.g. port status of a non-reporting DXC or what spare wavelengths are in use or available through the network. (A spares query is shown as step 922 in FIG. 9)

Once the failed caths are isolated, the failure data and spare capacity information is sent to a rerouting process 950. The rerouting process 950 preferably occurs at the centralized restoration OSS so no long-distance communication is necessary. The process 950 may comprise the selection of a routing plan from a database of pre-prepared routing plans, based upon wavelength information stored at the OSS and the nature of the failure. Alternatively, the rerouting process may be one in which alternate routes are not known beforehand and are thus established "on the fly".

An alternative routing plan, once established, is used by the centralized OSS to compile a list of reroute actions that are needed to implement the selected plan. These actions include coordinating all optical cross-connect switch systems along the selected route, downloading the routing map to those optical cross-connect switch, and commanding the optical cross-connect switch to reroute traffic through the network and deliver it to the destination. Step 925 of FIG. 9 illustrates that reroute action commands are sent to individual optical cross-connect switch. At completion of the rerouting, individual optical cross-connect switch status is forwarded back to OSS. For example, path verification 926 may be requested by the OSS at any desired time, possibly routinely after an alternative routing has been established. Path verification, along with wavelength spares auditing and port status queries may be used to present a current, real-time status of the network to an operator at the OSS site. The OSS then waits for normalization once the fiber cable is fixed.

In a telecommunications system according to the method of the invention, restoration of network traffic is accelerated since a node is not required to verify the failure and confirm a viable new path prior to rerouting traffic. Path verification is carried out only on command from the central OSS site and may, for example, be performed during a period of minimal traffic load on the node or fiber cable. A further advantage of the present invention is the use of optical cross-connect switches and other optical technologies, i.e. optical amplifier, to perform optical restoration directly. With high-speed data communication links between OSS and each switching node, alarm and coordination messages, routing maps, and status are conveyed among all the network elements. Using the spare capacity of the optical cross-connect system and available wavelengths within the network, the real-time multiple wavelength routing (RMWR) algorithm coordinates, selects, and routes restored traffic among selected paths either in a centralized or decentralized restoration system. Therefore, the present invention of network restoration system is well suited for the deployment of optical fiber-based telecommunication networks having optical based restoration systems.

While the present invention has been described in terms of a specific network applications, it should be understood that the principles of the present invention apply to networks of any structure. As will be clear to those skilled in the art, the present invention is not limited to, for example, any specific data format for the alarm messages, command signals and queries, or the method by which an alternative routing plan may be devised. Thus, the present invention should only be limited by the appended claims.

What is claimed is:

1. In an optical communication network having a plurality of nodes interconnected by a plurality of transmission links and an operation support system communicatively connected to said nodes, a method of selecting an alternate signal path for bypassing a failed link in the network, comprising the steps of:

a) detecting an alarm in said network indicative of a failed transmission link;

b) using wavelength information stored in said system for determining an alternate signal path to bypass said failed transmission link;

c) selecting from among said plurality of nodes a number of nodes to form said alternate signal path in said network;

d) downloading a routing map to each of said selected number of nodes in said alternate signal path;

e) commanding said selected number of nodes to set up said alternate signal path; and f) forwarding status information from said selected nodes to said operation support system upon completion of said alternate signal path.

2. An optical restoration system for use in an optical communication network formed from a plurality of nodes interconnected by a plurality of transmission links, said system comprising:

a) means for detecting failed links in a signal path in the network and generating an alarm;

b) means for receiving link failure alarms and port status messages from the nodes;

c) means for determining an alternate signal path between a sending station and a receiving station in the network bypassing a failed link and restoring communication between said sending and said receiving station; and d) means installed at each node for building an alternate routing table defining a restoration path for a failed path, the identity of nodes in such restoration path, and a restoration wave length at each node of the alternate path.

3. The optical restoration system of claim 2, wherein the means for determining an alternate signal path uses wavelength division multiplexing.

4. The optical restoration system of claim 3, wherein the means for determining an alternate signal path selects an alternate path to avoid wavelength collisions and cross-talk between adjacent signal paths in the network.

5. The optical restoration system of claim 4 wherein the means for determining an alternate path is installed in each node.

6. The optical restoration system of claim 5, wherein each said node includes an optical cross-connect switch.

7. The optical restoration system of claim 2 further including a central restoration site connected to each node by non-bearing links which do not carry high bandwidth network traffic.

8. The optical restoration system of claim 7 wherein the non-bearing links carry messages, mapping and status information between the central restoration site and the nodes.

9. The optical restoration system of claim 8 wherein the transmission links are optical conductors including traffic bearing fibers and spare fibers.

10. The optical restoration system of claim 9 further including an electronic digital cross-connect switch and an optical carrier network element.

11. The optical restoration system of claim 9 wherein the optical conductors include fibers having wavelength paths for carrying high bandwidth network traffic.

12. The optical restoration system of claim 11 wherein the fibers have spare wavelengths for carrying traffic when a transmission link fails.

13. The optical restoration system of claim 12, wherein the means for determining an alternate signal path selects a spare wavelength for carrying traffic when a transmission link fails.

14. The optical restoration system of claim 2, wherein the means for determining an alternate signal path uses space division multiplexing.

15. In an optical restoration system for use in an optical communication network formed from a plurality of nodes interconnected by a plurality of transmission links, a method of selecting an alternate signal path bypassing a failed link in the network, comprising the steps of:

a) detecting a failed link in a signal path by a node at the origin of the failed link;

b) requesting alternating routing information from adjacent nodes by the originating node;

c) determining at the originating node an alternate signal path bypassing the failed link in the network;

d) sending coordinating messages to selected nodes in the alternate signal path;

e) commanding the selected nodes to implement the alternate signal path;

f) advising a centralized support center of the status of the nodes in the alternate signal path; and g) uploading to the support center a routing map indicating the status of the nodes in the network.

16. In an optical telecommunications network having a plurality of nodes and links, said nodes comprising optical cross-connect switches using a combination of space and wavelength division multiplexing, a method of reconfiguring said optical network upon failure of a node or link comprising the steps of:

a) identifying the location of failure of said node or link;

b) analyzing the network configuration to determine an alternative network configuration that optimizes for space and wavelength division multiplexing while avoiding the location of failure of said node or link;

c) effecting network reconfiguration according to said alternative network configuration by building an alternate routing table at each node of an alternate route, the table including the identification of each node in the alternate path and a restoration wavelength for each optical fiber connected to said each node.

17. The method of claim 16 further comprising the steps of:

(a) setting up an end-to-end alternate routing table at the alternate node;

(b) setting up a restoration wavelength for each fiber connected to the alternate node;

(c) setting up a wavelength conversion for each fiber connected to the alternate node;

(d) sending a switch confirmation from a source node to an alternate node;

(e) initiating switching to the alternate signal path defined in the table upon receiving the switch confirmation; and (f) sending a confirmation back to the source node and reporting the alternate signal path to an operations support system.

18. The method of claim 16 further comprising the steps of:

(a) testing each fiber connected to an adjacent node for an available restoration wavelength; and (b) testing each fiber for a wavelength conversion if no restoration wavelength is available.

19. The method of claim 16 further comprising the steps of:

(a) determining if the alternate node is the destination for a signal path;

(b) building a first end-to-end table if the node is the destination for the signal path;

(c) returning a confirmation to a source node upon completion of the first end-to-end table for the destination signal path;

(d) waiting for a switch confirmation from the source node;

(e) building a second end-to-end table if the alternate node is not the destination for the signal path;

(f) sending the second table to the source node;

(g) broadcasting a request for an alternate route to adjacent nodes; and (h) waiting for switch confirmation from the source node.

* * * * *